US008358021B2

(12) United States Patent
Chow

(10) Patent No.: US 8,358,021 B2
(45) Date of Patent: Jan. 22, 2013

(54) CYCLIC GRAVITATION POWER GENERATION SYSTEM

(76) Inventor: Albert Chow, Taipei County (TW)

( * ) Notice: Subject to any disclaimer, the term of this patent is extended or adjusted under 35 U.S.C. 154(b) by 428 days.

(21) Appl. No.: 12/780,362

(22) Filed: May 14, 2010

(65) Prior Publication Data

US 2011/0278855 A1 Nov. 17, 2011

(51) Int. Cl.
*F02B 63/04* (2006.01)
*H02K 7/10* (2006.01)
*H02K 7/18* (2006.01)

(52) U.S. Cl. ........................................................ 290/1 C

(58) Field of Classification Search .................. 290/1 R, 290/1 C, 1 D, 53, 42, 43, 54
See application file for complete search history.

(56) References Cited

U.S. PATENT DOCUMENTS 7,765,804 B2 * 8/2010 Davis ............................. 60/495
2008/0092535 A1 * 4/2008 Razack ........................... 60/496

* cited by examiner

*Primary Examiner* — Javaid Nasri

(74) *Attorney, Agent, or Firm* — Muncy, Geissler, Olds & Lowe, PLLC

(57) ABSTRACT

The present invention proposes a cyclic gravitation power generation system, which comprises a vertical water tank, a propulsive device, a guiding device, a carrying device and a power generation device, wherein potential energy is converted into kinetic energy to drive a generator to generate electric power when float balls are moved downward from a high position to a low position by gravity, and the vertical water tank can make the float balls to be moved back to the high position to perform a cyclic operation, whereby is achieved a low-cost cyclic power generation system.

6 Claims, 7 Drawing Sheets

CYCLIC GRAVITATION POWER GENERATION SYSTEM

FIELD OF THE INVENTION

The present invention relates to a power generation system, particularly to a gravitation power generation system.

BACKGROUND OF THE INVENTION

In the modern world, electricity is indispensable energy for daily life as well as for industrial development.

Electricity is usually generated by a nuclear power plant or a thermal power plant. However, the conventional power plants generate nuclear waste or emit carbon dioxide to ruin the environment. Therefore, much attention is paid to the green energy systems, such as the wind power generation system, hydroelectric power generation system and solar power generation system.

The green energies are environment-friendly and sustainable. However, the green energies are expensive and hard to harness artificially at present. Therefore, they cannot extensively replace the conventional energy sources yet.

Accordingly, the Inventor proposes a cyclic gravitation power generation system, which is expected to generate electric power with a low investment.

SUMMARY OF THE INVENTION

The primary objective of the present invention is to provide a cyclic gravitation power generation system, wherein potential energy is converted into kinetic energy to drive a generator to generate electric power when float balls are moved downward from a high position to a low position by gravity, and wherein a vertical water tank can make the float balls to move back to the high position from the low position to perform a cyclic operation, whereby is achieved a low-cost cyclic power generation system.

To achieve the abovementioned objective, the present invention proposes a cyclic gravitation power generation system, which circulates float balls thereinside to generate electric power and comprises a vertical water tank, a propulsive device, a guiding device, a carrying device and a power generation device. The vertical water tank further comprises a holding space, a block plate and a guiding portion. The holding space has an aperture on a side wall near the bottom of the vertical water tank. The block plate is hinged on the wall of the vertical water tank to cover the aperture. The guiding member is formed at an opening of the vertical water tank. The propulsive device is a hollow structure and further comprises an inlet at a lateral of the propulsive device. One end of the propulsive device is coupled to the aperture to interconnect with the vertical water tank. The other end of the propulsive device has a hydraulic propeller, and the propulsive device is tilted upward to the hydraulic propeller. The guiding device further comprises two rotary wheels and a first transmission belt wound around the two rotary wheels. A plurality of guiding elements are installed on the first transmission belt. The guiding device is located above the guiding portion of the vertical water tank, and has one end fixedly installed at the opening of the vertical water tank. The carrying device further comprises an upper wheel assembly, a lower wheel assembly and a second transmission belt wound around the upper wheel assembly and the lower wheel assembly. The upper wheel assembly and the lower wheel assembly are respectively installed at a high position and a low position opposite to the high position. The lower wheel assembly is located above the inlet of the propulsive device. A plurality of carrying elements are installed on the second transmission belt. A coupling transmission belt is wound around the upper wheel assembly and one rotary wheel of the guiding device. The power generation device further comprises a speed-change gear assembly and a generator coupled to the speed-change gear assembly. The speed-change gear assembly is coupled with the lower wheel assembly of the carrying device. The rotation of the lower wheel assembly can rotate the speed-change gear assembly to drive the generator to generate electric energy.

DETAILED DESCRIPTION OF THE PREFERRED EMBODIMENTS

Figure 1:
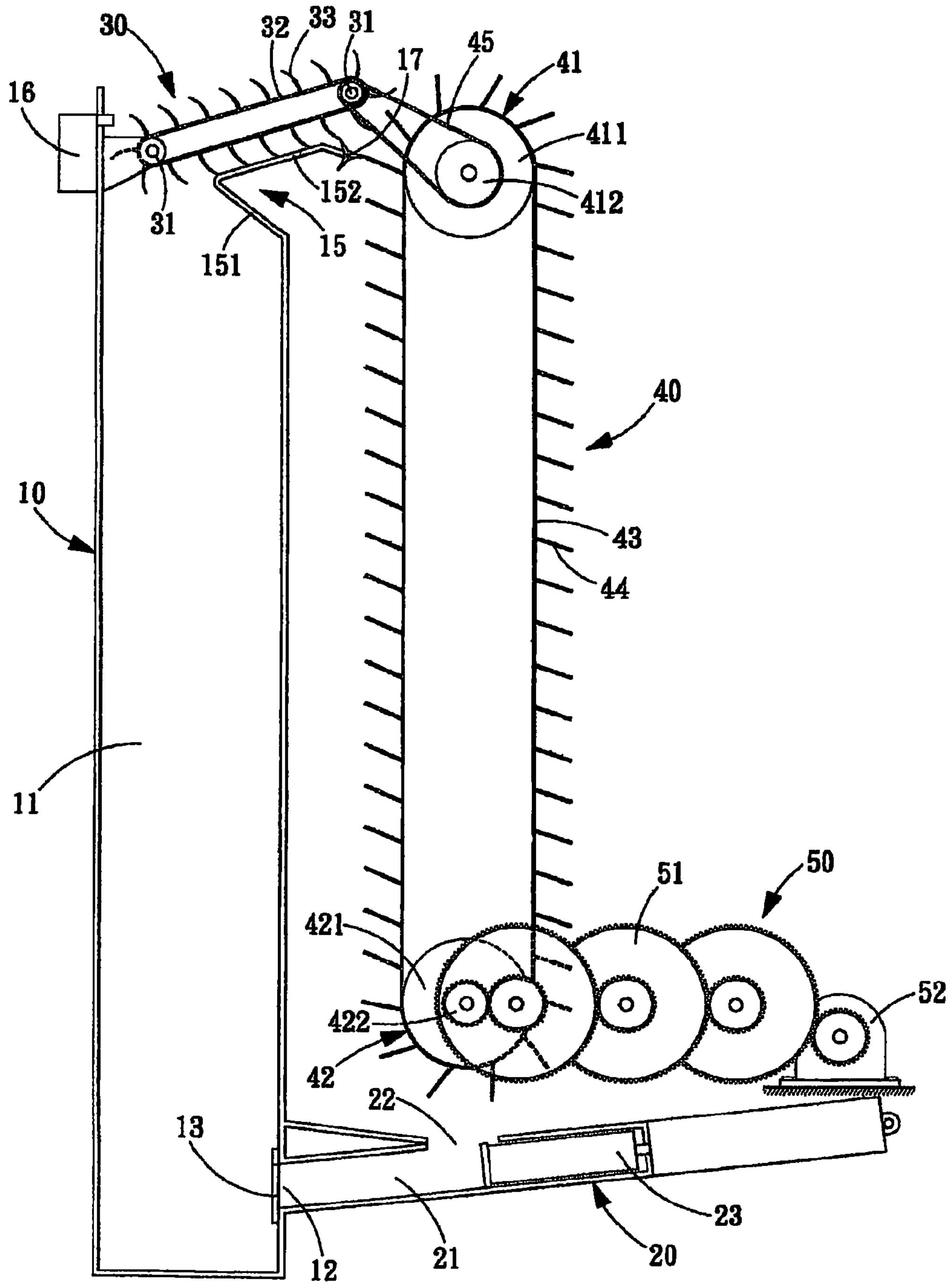
FIG. 1 is a diagram schematically showing a cyclic gravitation power generation system according to the present invention.
Figure 2:
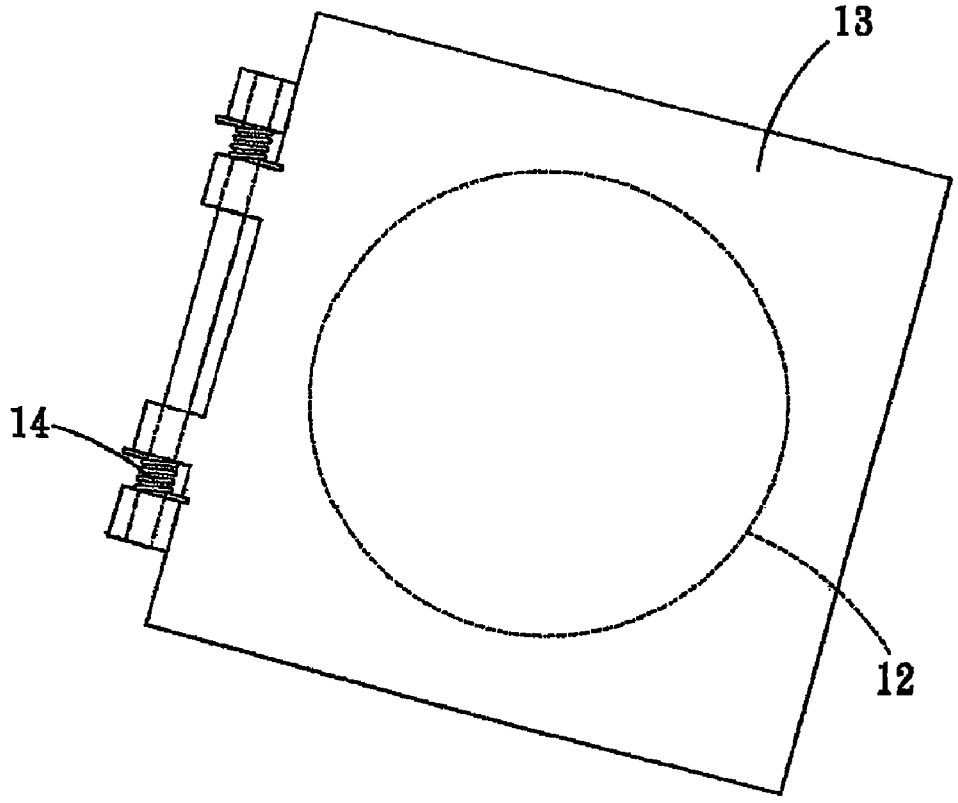
FIG. 2 is a diagram schematically showing a block plate inside a vertical water tank of a cyclic gravitation power generation system according to the present invention.
Figure 3:
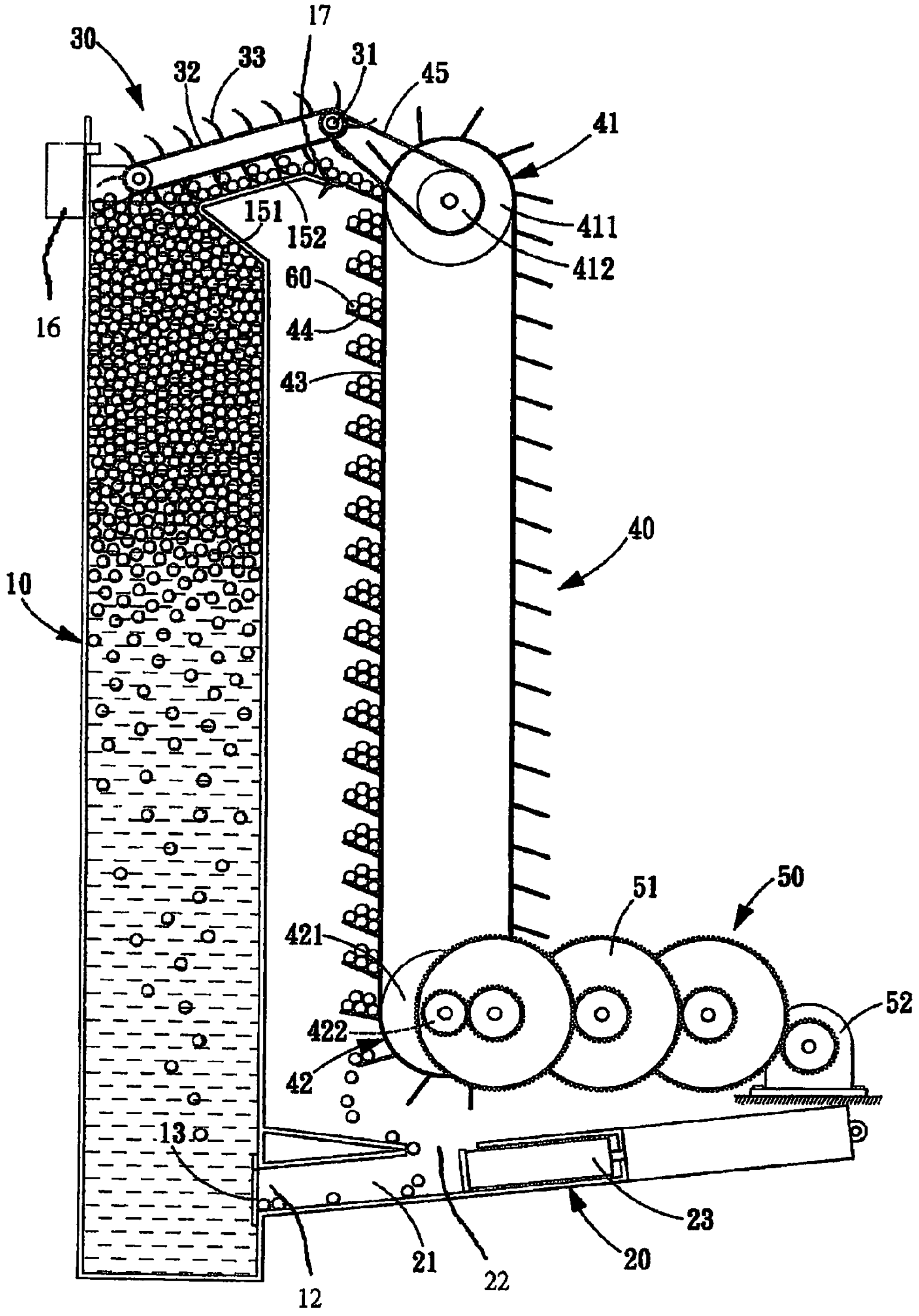
FIG. 3 is a diagram schematically showing the cyclic condition of a cyclic gravitation power generation system according to the present invention.

Refer to FIGS. 1-3. The cyclic gravitation power generation system of the present invention circulates float balls 60 thereinside to generate electric power and comprises a vertical water tank 10, a propulsive device 20, a guiding device 30, a carrying device 40 and a power generation device 50.

The vertical water tank 10 has a holding space 11. The holding space 11 has an aperture 12 on a side wall near the bottom thereof. A block plate 13 is hinged on the wall of the vertical water tank 10 to cover the aperture 12. A pivot of the block plate 13 has at least one torsion spring 14 to automatically restore the opened block plate 13 back to the closed state. The block plate 13 is tilted toward the bottom of the vertical water tank 10. An opening of the vertical water tank 10 has a guiding portion 15. The guiding portion 15 has a confining section 151 extending toward the interior of the vertical water tank 10 and a guiding section 152 extending outward from the vertical water tank 10. The confining section 151 can confine the float balls 60 in a region on the surface of water. An automatic water supply device 16 is installed at the opening of the vertical water tank 10 and used to control the water level. A rotary control device 17 is installed at one end of the guiding section 152 and used to guide the movement of the float balls 60.

The propulsive device 20 is a hollow structure having a holding portion 21 to receive the float balls 60 and an inlet 22 at a lateral thereof. The propulsive device 20 has one end coupled to the aperture 12 to interconnect with the vertical water tank 20. The propulsive device 20 has a hydraulic propeller 23 at the other end. The propulsive device 20 is tilted upward to the hydraulic propeller 23, whereby the float balls 60 are gathered in the region near the aperture 12 of the vertical water tank 10.

The guiding device 30 has two rotary wheels 31. A first transmission belt 32 is wound around the two rotary wheels 31. A plurality of guiding elements 33 are installed on the first transmission belt 32. The guiding device 30 is located above the guiding section 152. The guiding device 30 has one end fixedly installed at the opening of the vertical water tank 10. The guiding elements 33 can push and guide the float balls 60 to move along the guiding section 152.

The carrying device 40 has an upper wheel assembly 41 and a lower wheel assembly 42. The upper wheel assembly 41 and the lower wheel assembly 42 are respectively installed at a high position and a low position opposite to the high position. The lower wheel assembly 42 is located above the inlet 22 of the propulsive device 20. The upper wheel assembly 41 has an upper wheel 411 and a coupling wheel 412 coaxial with the upper wheel 411. The lower wheel assembly 42 has a lower wheel 421 and a driving gear 422 coaxial with the lower wheel 421. A second transmission belt 43 is wound around the upper wheel 411 and the lower wheel 421. A plurality of carrying elements 44 are installed on the second transmission belt 43 and used to hold the float balls 60 moving from a high position to a low position. A coupling transmission belt 45 is wound around the coupling wheel 412 and one rotary wheel 31 of the guiding device 30, whereby the rotation of the carrying device 40 can drive the guiding device 30 to rotate.

The power generation device 50 has a speed-change gear assembly 51 and a generator 52 coupled to the speed-change gear assembly 51. The speed-change gear assembly 51 is engaged with the driving gear 422 of the carrying device 40, whereby the rotation of the driving gear 422 can rotate the speed-change gear assembly 51 to drive the generator 52 to generate electric energy.

As shown in FIG. 3, when the float balls 60 are placed on the carrying elements 44 of the carrying device 40, the gravity moves the float balls 60 downward from a high position to a low position and drives the second transmission belt 43 to rotate counterclockwise. The rotated second transmission belt 43 drives the upper and lower wheel assemblies 41 and 42 to rotate counterclockwise also. The driving gear 422 of the rotated lower wheel assembly 42 rotates the speed-change gear assembly 51 and drives the generator 52 to generate electric power for use or storage. The speed-change gear assembly 51 can increase the rotational speed to enhance the efficiency of power generation.

Figure 4:
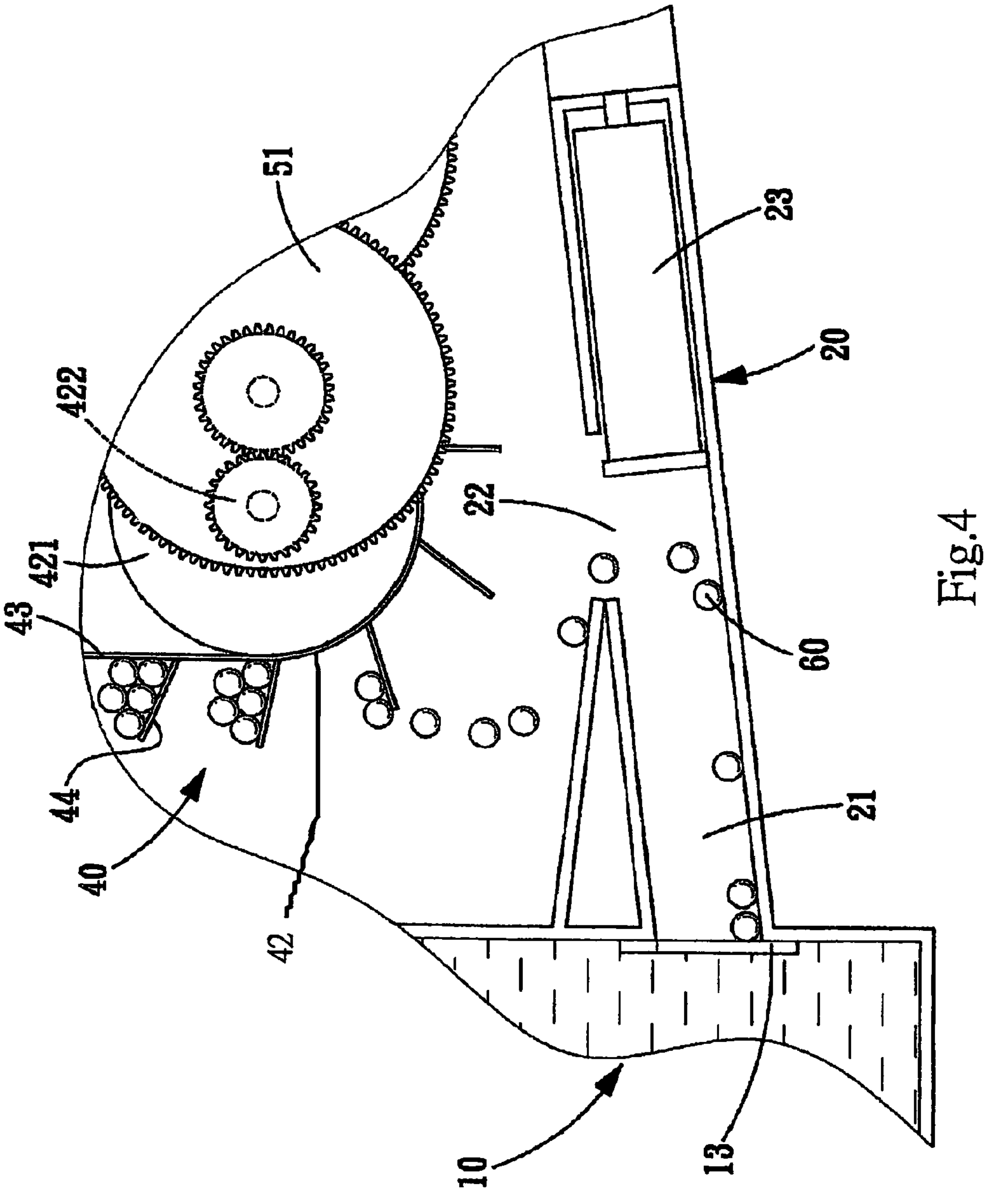
FIG. 4 is a diagram schematically showing the cyclic condition that float balls are delivered from a carrying device to a propulsive device in a cyclic gravitation power generation system according to the present invention.
Figure 5A:
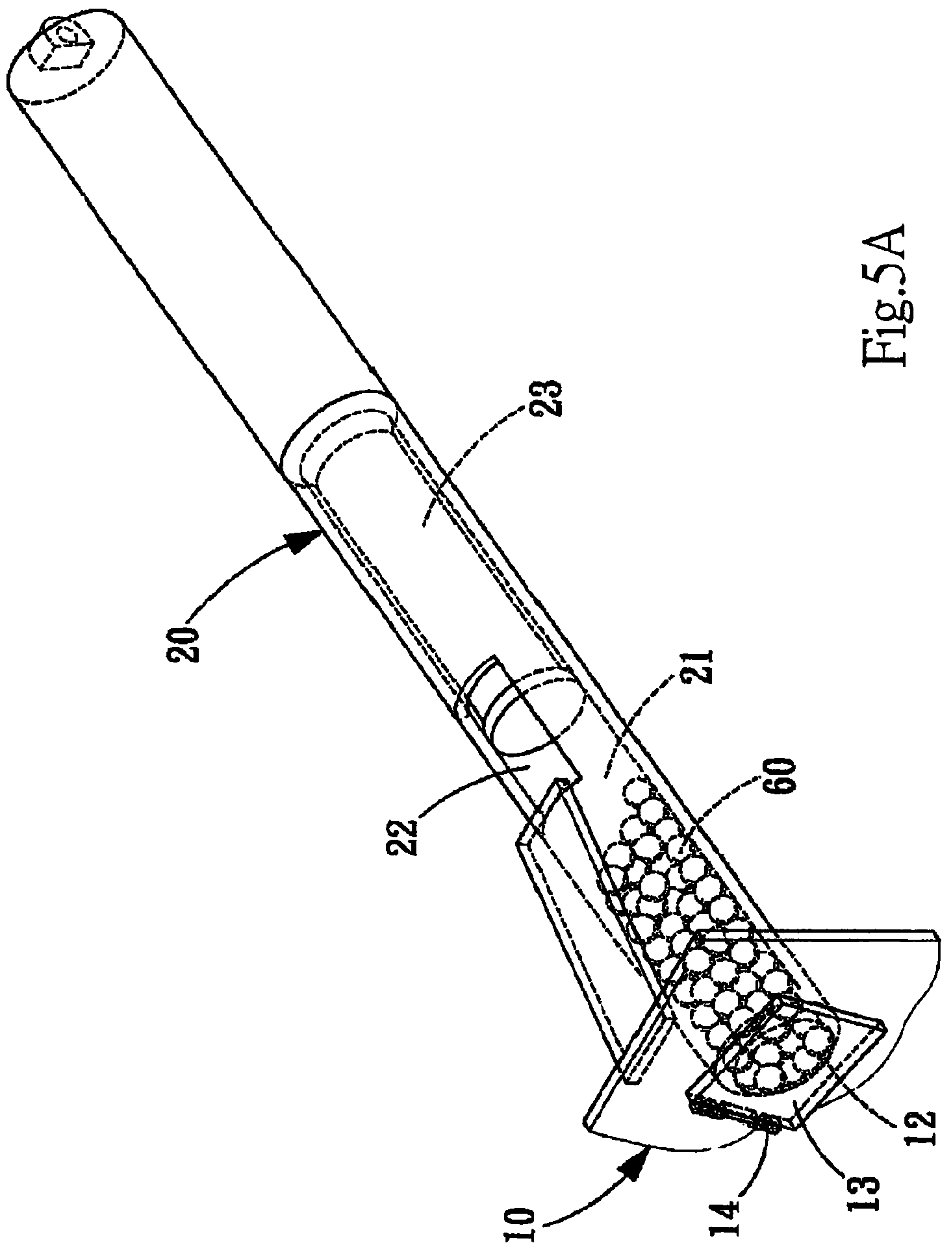
FIG. 5A is a diagram schematically showing that a hydraulic propeller is not propelled according to the present invention.
Figure 5B:
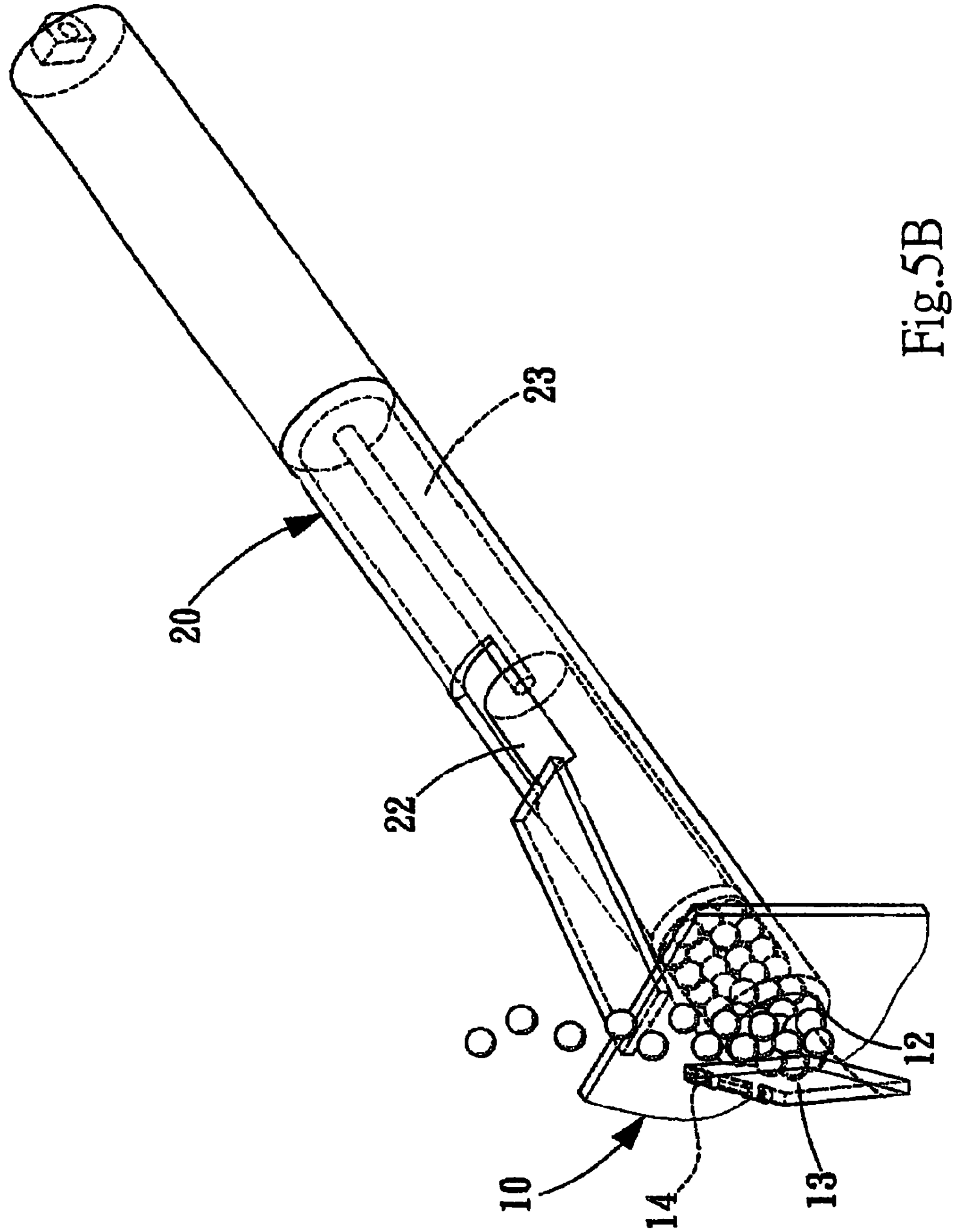
FIG. 5B is a diagram schematically showing that a hydraulic propeller is propelled according to the present invention.

Refer to FIG. 4, FIG. 5A and FIG. 5B. The float balls 60 are moved from a high position to a lower position by gravity and then dropped into the inlet 22 of the propulsive device 20 below the carrying device 40. As the propulsive device 20 is tilted, the float balls are collected in the holding portion 21 spontaneously. When the float balls 60 are accumulated to a given quantity, the hydraulic propeller 23 is propelled to open the block plate 13 toward the aperture 12 of the vertical water tank 10. Thus, the float balls 60 are pushed into the vertical water tank 10 fully filled with water. As the specific gravity of the float balls 60 is smaller than that of water, the float balls 60 float to the opening of the vertical water tank 10 spontaneously. As mentioned above, the block plate 13 is tilted toward the bottom of the vertical water tank 10, the float balls 60 can easily enter into water once the float balls 60 push the block plate 13 to open slightly. When the float balls 60 no more push the block plate 13, the torsion spring 14, which is installed in the pivot of the block plate 13, automatically restores to close the block plate 13.

Figure 6:
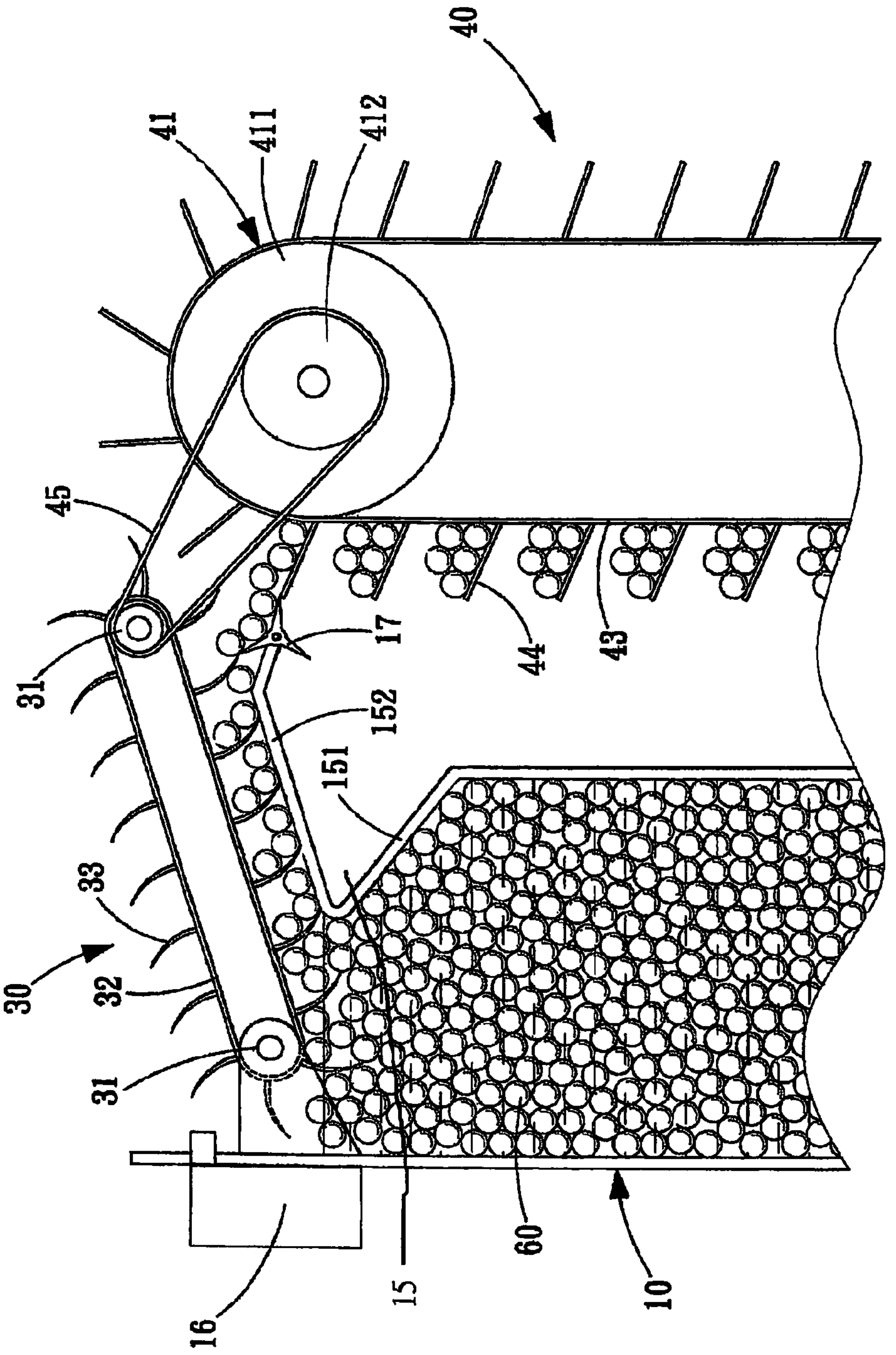
FIG. 6 is a diagram schematically showing the cyclic condition that float balls are delivered from a guiding device to a carrying device in a cyclic gravitation power generation system according to the present invention.

Refer to FIG. 6. As mentioned above, the coupling transmission belt 45 is wound around the coupling wheel 412 of the upper wheel assembly 41 and one rotary wheel 31 of the guiding device 30. When the upper wheel assembly 41 of the carrying device 40 is driven to rotate counterclockwise, the rotary wheel 31 of the guiding device 30 is rotated counterclockwise. Thus, the guiding elements 33 on the first transmission belt 32 also are moved counterclockwise and moved to the position where the float balls 60 are gathered by the confining section 151 and can be pushed and guided by the guiding elements 33. Thus, the guiding elements 33 can guide and push the float balls 60 to move along the guiding section 152 to drop onto the carrying elements 44 of the carrying device 40. Then, the float balls 60 are moved from the high position to the low position once again. Thereby, the present invention can cyclically generate electric power by utilizing gravity.

An automatic water supply device 16 is installed at the opening of the vertical water tank 10 and used to control the water level. A rotary control device 17 is installed at one end of the guiding section 152 to increase the smoothness of guiding the float balls 60 from the guiding device 30 into the carrying elements 44 of the carrying device 40. The rotary control device 17 can also adjust the number of the float balls 60 delivered into the carrying elements 44, whereby each carrying element 44 can hold a constant number of the float balls 60, wherefore the carrying elements 44 are descended by gravity and moved to drive the driving gear 422 to rotate at a constant speed. Thus, stable power output is provided to drive the generator 52 to generate electric power.

The present invention can generate electric power via merely using the vertical water tank 10, propulsive device 20, guiding device 30, carrying device 40 and power generation device 50. Thus, the present invention needs a cost lower than that of a wind generator, a hydroelectric generator, or a solar generator. Therefore, the present invention has considerable industrial competitiveness.

What is claimed is:

1. A cyclic gravitation power generation system, which circulates float balls thereinside to generate electric power, comprising:

a vertical water tank further including a holding space, a block plate and a guiding portion, wherein the holding space includes an aperture on a side wall near the bottom of the vertical water tank, and wherein the block plate is hinged on a wall of the vertical water tank to cover the aperture, and wherein the vertical water tank includes an opening formed said guiding portion;

a propulsive device being a hollow structure and further including an inlet at a lateral thereof, wherein the propulsive device includes one end coupled to the aperture to interconnect with the vertical water tank, and the other end installed a hydraulic propeller, and wherein the propulsive device is tilted upward to the hydraulic propeller;

a guiding device located above the guiding portion of the vertical water tank and further including two rotary wheels and a first transmission belt wound around the two rotary wheels, wherein a plurality of guiding elements are installed on the first transmission belt, and wherein the guiding device includes one end fixedly installed at the opening of the vertical water tank;

a carrying device further including an upper wheel assembly, a lower wheel assembly and a second transmission belt wound around the upper wheel assembly and the lower wheel assembly, wherein the upper wheel assembly and the lower wheel assembly are respectively installed at a high position and a low position opposite to the high position, wherein the lower wheel assembly is located above the inlet of the propulsive device, and wherein the second transmission belt is installed a plurality of carrying elements, and wherein a coupling transmission belt is wound around the upper wheel assembly and one rotary wheel of the guiding device; and a power generation device further including a speed-change gear assembly and a generator coupled to the speed-change gear assembly, wherein the speed-change gear assembly is coupled with the lower wheel assembly of the carrying device, and wherein the rotation of the lower wheel assembly rotates the speed-change gear assembly to drive the generator to generate electric power.

2. The cyclic gravitation power generation system according to claim 1, wherein the vertical water tank includes an automatic water supply device at the opening.

3. The cyclic gravitation power generation system according to claim 1, wherein the guiding portion of the vertical water tank includes a rotary control device.

4. The cyclic gravitation power generation system according to claim 1, wherein the block plate includes a pivot installed at least one torsion spring.

5. The cyclic gravitation power generation system according to claim 1, wherein the block plate is tilted toward the bottom of the vertical water tank.

6. The cyclic gravitation power generation system according to claim 1, wherein the float balls respectively have a specific gravity smaller than that of water.

* * * * *